United States Patent Office 3,632,686
Patented Jan. 4, 1972

3,632,686
STABILIZED FORMALDEHYDE POLYMERS CONTAINING POLYVINYL PYRROLIDONE AND THIOBISPHENOLS
Jacob Ackermann, Gaudenzio Bianchi, and Pierino Radici, Milan, Italy, assignors to Societá Italiana Resine S.p.A., Milan, Italy
No Drawing. Filed Feb. 18, 1969, Ser. No. 800,273
Claims priority, application Italy, Mar. 7, 1968, 828,449/68
Int. Cl. C08f 33/08, 41/12
U.S. Cl. 260—895
8 Claims

ABSTRACT OF THE DISCLOSURE

A polymeric composition, consisting essentially of (a) a member selected from the group consisting of a formaldehyde polymer and a formaldehyde copolymer, which contains $(CH_2O)_n$ units in the macromolecule thereof; (b) at least one thiobisphenol compound selected from the group consisting of thiobisphenols of the formula:

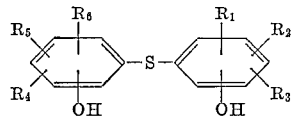

wherein $R_1$, $R_2$, $R_3$, $R_4$, $R_5$ and $R_6$ are selected from the group consisting of hydrogen, methyl, ehtyl, isopropyl and tert-butyl; and (c) polyvinyl pyrrolidone, said thiobisphenol and said polyvinyl pyrrolidone being stabilizers for the formaldehyde polymer or formaldehyde copolymer, the total amount of stabilizers (b) and (c) ranging from 0.01 to 5.0% by weight with respect to the formaldehyde polymer or formaldehyde copolymer, and the weight ratio of the thiobisphenol (b) to the polyvinyl pyrrolidone (c) being 0.1:1 to 3.5:1.

FIELD OF THE INVENTION

The invention relates to the stabilization of formaldehyde polymers and copolymers and especially to stabilized compositions of such polymers.

BACKGROUND TO THE INVENTION

By "formaldehyde polymers" we mean high molecular weight polymers formed from formaldehyde, wherein the terminal groups of the polymer have been converted, for instance, to ester, ether or urethane groups. It is known in the art that raw polymers obtained by the polymerization or co-polymerization of formaldehyde contain in each macromolecule at least one hydroxyl group, which makes the product thermally unstable. Therefore, in order to avoid depolymerization, these hydroxyl groups are known to be converted, for instance, to ether or, preferably now, to ester groups.

Formaldehyde copolymers as referred to herein are formaldehyde polymers containing in the chain some groups of the formula:

wherein $R_1$ and $R_2$ may be radicals of various kinds an $n$ is an integer of at least 2, and in which the unstable fraction in the molecule is removed by controlled degradation.

Though the stability of the formaldehyde polymers is improved by the abovementioned treatments they still are unsatisfactory for their customary uses. It is therefore known to add various stabilizers thereto, such as amino or phenol antioxidants and slightly basic compounds capable of absorbing formaldehyde or the oxidation products of formaldehyde or of the polymer. Amines, amides, polyamides, urea and derivatives thereof can, for instance, be employed. These substances, which are intended to improve the thermal stability of the above defined polymers and protect their chain from degradation due especially to oxygen and heat, do not, however, yield fully satisfactory results.

It is therefore an object of the invention to stabilize formaldehyde polymers in an improved manner.

It is a further object to provide formaldehyde polymer compositions which have improved stability against heat and oxidation.

SUMMARY OF THE INVENTION

It has now been found that exceptionally advantageous effects are obtained in stabilizing the above defined formaldehyde polymers or copolymers by using particular combinations of stabilizing additives.

Stabilized compositions according to the invention consist of (i) a formaldehyde polymer or copolymer (as hereinbefore defined) and as stabilizers (ii) one or more acidic, substituted or unsubstituted thiobisphenols of the general formula:

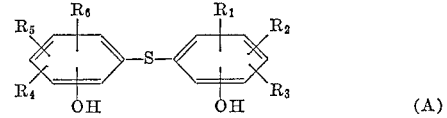 (A)

wherein $R_1$, $R_2$, $R_3$, $R_4$, $R_5$ and $R_6$ are hydrogen or, preferably, methyl, ethyl, isopropyl or tert-butyl radicals; and (iii) one or more basic polymeric compounds of the general formula:

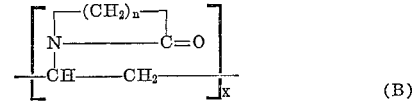 (B)

wherein $x$ is an integer exceeding about 50, and $n$ is an integer of 3 to 6.

The antioxidant effect of compounds of class A as well as the heat stabilizing effect conferred by the compounds of class B are known in the art. However, we have surprisingly found that the specific effects (such as, for instance, thermal stability and anti-oxidation) due to the combined use of the compounds of the two above described classes exceed the effects of the individual components employed either separately or in combination with other known stabilizers. The improvements due to this combination are more accentuated (i.e. synergystic) than those usually obtained through the joint use of phenol compounds and compounds of a basic character other than those belonging to the above defined classes.

DESCRIPTION OF THE PREFERRED EMBODIMENTS

A preferred thio compound for use in the invention is 4,4′-thio-bis(6-tertbutyl-3-methylphenol). Preferred basic polymeric stabilizers include polyvinylpyrrollidone and polyamide terpolymers.

Best results are obtained by employing a quantity of stabilizers (sum of the compounds of classes A and B) of 0.01 to 5.0% preferably 0.1 to 3.0%, by weight with respect to the formaldehyde polymer. Values below 0.01% do not give sufficient stabilizing effects, nor is it convenient to employ larger quantities than 5.0%, which would not give any appreciable improvements.

In order to obtain adequate stabilizing effect, the weight ratio of the compounds of class A to those of class B in the stabilizing compositions must amount to 0.1:1 to 3.5:1, preferably 0.5:1 to 2.0:1.

Use of the stabilizing additives under the above defined conditions yields formaldehyde polymers or copolymers of high thermal stability in a solid or molten state and in the presence or absence of oxygen. Splitting of the polymeric chains is substantially completely avoided, thereby preventing deterioration of the polymer by the action of oxygen, heat, light and corrosive products. Thus, the polymers are easily workable to form shaped products, such as by drawing, spinning or injection moulding, and the resulting articles maintain their properties unaltered with time.

The stabilizers may be added to the formaldehyde polymers or copolymers by any known method, such as by mixing in the form of finely divided solids, or they may be added after dissolving them in a solvent. Preferably, the stabilizers are dissolved in suitable solvents and added to a portion of the polymer, the solvent is evaporated, whereupon mixing and homogenizing with a further quantity of polymer is carried out to obtain compositions within the above described limits.

The following examples are given to illustrate the invention but do not limit it. Percentages are by weight, and in the case of the stabilizers are based on the weight of the polymer.

In Examples 1 to 4, the formaldehyde polymer used was obtained by polymerizing pure monomeric formaldehyde in cyclohexanol solvent in the presence of a polymerization initiator. The raw polymer was then esterified with acetic anhydride at a temperature of about 155° C., washed with toluene, and finally dried in vacuum at 70° C. The resulting formaldehyde polymer had an intrinsic viscosity of 1.35 (determined at a temperature of 60° C., the polymer being dissolved in p-chlorophenol containing 2% alpha-pinene).

In Examples 5 and 6, the formaldehyde polymer was prepared by the above described process, and had an intrinsic viscosity of 1.9. In Examples 7 to 9 the polymer had a molecular weight of 60,000 calculated from a determination of the terminal ester groups.

Examples 4, 5, 7 and 8 illustrate the invention; the remainder are comparative examples.

Each of the formaldehyde polymers or polymer compositions were subjected to some of the following tests:

(a) Drawing ability: the polymer is drawn by means of a screw extruder at a temperature of 200° C., then cut to cubes of 2 to 3 mm. size.

(b) Thermal degradation in nitrogen (K 220): the weight loss of the polymer expressed in percentage by minute during the first 30 minutes is determined by heating to 220° C. in a nitrogen medium.

(c) Thermal degradation in the air ($D_{220}$): the weight loss expressed in polymer percentage is determined after 10 and 20 minutes heating in the air at 220° C. During these tests 50 mg. of the sample were placed into a boat of cylindrical shape 10 mm. in diameter and 12 mm. in height.

(d) Resiliency: the "Izod" resiliency is measured in kp. cm./cm. by the ASTM method, on a bar obtained by injection moulding.

(e) Resiliency after ageing: the "Izod" resiliency was determined in kp. cm./cm. on a bar obtained by injection moulding after artificial accelerated ageing by exposing for 500 hours to a 280 watt "Westinghouse" sun lamp.

(f) Colour fastness: this test was carried out on the granulated product (obtained as described in the preceding tests) by melting it in a horizontal steel tube provided at its bottom with an extrusion nozzle and with a piston for extruding the melted product on completion of the test. The tube is 9.5 mm. in diameter and 150 mm. in height. Any change in colour of the extruded product is ascertained after 60 minutes at a temperature of 200° C.

EXAMPLES 1 TO 4

In Example 1 the polymer was tested without any added stabilizer.

In Example 2 the formaldehyde polymer was admixed with 4,4'-thio-bis(6-tert-butyl-3-methylphenol)(TTM) in a quantity of 0.5%, by dissolving the latter in benzene and adding the solution to a portion of the polymer in powder form. The solvent was evaporated, and the polymer containing about 10% stabilizer, was mixed with a further quantity of untreated polymer to bring the composition to the abovementioned values, then homogenized.

In Example 3 the polymer was admixed with 0.5% of polyvinylpyrrolidone (PVP) of a molecular weight of 15,000. This stabilizer was added in the form of an aqueous solution, whereafter the procedure was as in Example 2.

In Example 4 the formaldehyde polymer was admixed with both TTM in a quantity of 0.2% and also with 0.3% of the PVP. These stabilizers were added as in Examples 2 and 3.

Table 1 summarizes the results of tests on the resultant polymer or polymer composition. In the tests of Examples 1 and 2 a considerable amount of gas was evolved on drawing, thus impairing the articles. On drawing the polymer of Example 3 less gas was evolved than in the preceding tests, but the articles were still impaired in these cases, whereas the product of Example 4 was of a high standard and was totally free from gas bubbles.

TABLE 1

| Example | K 220 | D 220 10 min. | D 220 20 min. | "Izod" resiliency (kp. cm./cm.) |
|---|---|---|---|---|
| 1 | 0.32 | 8 | 32 | 4.5 |
| 2 | 0.28 | 3 | 8 | 4.8 |
| 3 | 0.20 | 7 | 25 | 3.5 |
| 4 | 0.10 | 1 | 2.2 | 6.5 |

EXAMPLES 5 AND 6

In Example 5 the polymer was admixed with PVP of molecular weight 90,000, and with TTM, each in a quantity of 0.6%.

In Example 6 the stabilizers were a polyamide terpolymer and 4,4'-butylidene-bis(3-methyl-6-tert-butylphenol), each in a quantity of 0.6%.

In both examples the additives were added by grinding them to powder and adding them to the polymer in this form, followed by homogenizing.

The results of tests on the polymer compositions are summarized in Table 2.

TABLE 2

| Example | D 220 10 min. | D 220 20 min. | Colour fastness |
|---|---|---|---|
| 5 | 0.7 | 1.1 | No change in colour occurred. |
| 6 | 1.5 | 2.5 | The product became brown in colour. |

EXAMPLES 7 TO 9

In Example 7 the polymer was admixed with 0.5% by weight PVP (molecular weight 30,000) and with 0.6% TTM; in Example 8 with 0.5% of a polyamide terpolymer and 0.6% of TTM; and in Example 9 with 0.5% of PVP (molecular weight 30,000) and 0.6% of 4,4'-butylidene-bis(3-methyl-6-tert-butylphenol).

In these examples the phenol compound, dissolved in toluene, and the compound of a basic character, dissolved in a mixture of 80% by weight ethanol and 20% by weight water, were sprayed on the polymer. The solvent was then evaporated in an oven with nitrogen circulation at a temperature of 105° C.

The results are summarized in Table 3.

TABLE 3

| Example | K 220 | D 220 10 min. | D 220 20 min. | "Izod" resiliency after ageing (kp. cm./cm.) Start | "Izod" resiliency after ageing (kp. cm./cm.) After 500 hrs. |
| --- | --- | --- | --- | --- | --- |
| 7 | 0.05 | 0.6 | 0.9 | 7.6 | 7.4 |
| 8 | 0.10 | 1.1 | 2.0 | 7.6 | 3.5 |
| 9 | 0.13 | 2.5 | 3.5 | 7.0 | 5.5 |

We claim:
1. A polymeric composition, consisting essentially of (a) a member selected from the group consisting of a formaldehyde polymer and a formaldehyde copolymer, which contains $(CH_2O)_n$ units in the macromolecule thereof; (b) at least one thiobisphenol compound selected from the group consisting of thiobisphenols of the formula:

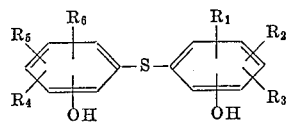

wherein $R_1$, $R_2$, $R_3$, $R_4$, $R_5$ and $R_6$ are selected from the group consisting of hydrogen, methyl, ethyl, isopropyl and tert-butyl; and (c) polyvinyl pyrrolidone, said thiobisphenol and said polyvinyl pyrrolidone being stabilizers for the formaldehyde polymer or formaldehyde copolymer, the total amount of stabilizers (b) and (c) ranging from 0.01 to 5.0% by weight with respect to the formaldehyde polymer or formaldehyde copolymer, and the weight ratio of the thiobisphenol (b) to the polyvinyl pyrrolidone (c) being 0.1:1 to 3.5:1.

2. The composition of claim 1 wherein the total amount of said stabilizers (b) and (c) ranges from 0.1 to 3.0 percent by weight with respect to the formaldehyde polymer or copolymer.

3. The composition of claim 1 wherein the weight ratio of the thiobisphenol (b) to the polyvinyl pyrrolidone (c) ranges from 0.5:1 to 2.0:1.

4. The composition of claim 1 wherein the thiobisphenol is 4,4-thio-bis(6-tert-butyl-3-methylphenol).

5. A method for preparing the polymeric composition of claim 1 which comprises:
(a) dissolving the thiobisphenol and the polyvinyl pyrrolidone in separate solvents,
(b) adding the resulting solutions to a portion of the formaldehyde polymer or copolymer,
(c) evaporating the solvent, and
(d) mixing the resultant mixture with the remainder of the polymer or copolymer,
the total amount of thiobisphenol and polyvinyl pyrrolidone ranging from 0.01 to 5.0 percent by weight with respect to the total amount of formaldehyde polymer or formaldehyde copolymer, and the weight ratio of the thiobisphenol to the polyvinyl pyrrolidone ranging from 0.1:1 to 3.5:1.

6. The method of claim 5 wherein the total amount of stabilizers present (the thiobisphenol and polyvinyl pyrrolidone) ranges from 0.1 to 3.0 percent by weight with respect to the formaldehyde polymer or copolymer.

7. The method of claim 5 wherein the weight ratio of the thiobisphenol to the polyvinyl pyrrolidone ranges from 0.5:1 to 2.0:1.

8. The method of claim 5 wherein the thiobisphenol is 4,4-thio-bis(6-tert-butyl-3-methylphenol).

References Cited

UNITED STATES PATENTS

| | | | |
| --- | --- | --- | --- |
| 2,993,025 | 7/1961 | Alsup | 260—857 |
| 3,355,514 | 11/1967 | Walle | 260—857 |
| 3,406,223 | 10/1968 | Gibbs | 260—857 |
| 3,479,314 | 11/1969 | Williams | 260—857 |
| 3,480,694 | 11/1969 | Moncure | 260—45.95 |
| 3,484,399 | 12/1969 | Kakes | 260—45.95 |

FOREIGN PATENTS

| | | | |
| --- | --- | --- | --- |
| 1,441,938 | 5/1966 | France | 260—45.95 |
| 43/20,374 | 9/1968 | Japan | 260—45.95 |

PAUL LIEBERMAN, Primary Examiner

U.S. Cl. X.R.

260—45.7 S, 45.95, 67 FP, 857 R